Patented Sept. 13, 1927.

1,642,155

UNITED STATES PATENT OFFICE.

JOHANNES M. KESSLER, OF WEST ORANGE, NEW JERSEY, ASSIGNOR TO E. I. DU PONT DE NEMOURS & COMPANY, OF WILMINGTON, DELAWARE, A CORPORATION OF DELAWARE.

RESIN-CONTAINING COATING COMPOSITION.

No Drawing. Application filed February 3, 1920. Serial No. 355,960.

This invention relates to liquid coating compositions, and particularly to high grade lacquers, which contain as their essential constituents natural (as distinguished from synthetic) resin or gum, a vegetable oil softener such as China wood oil, and a volatile organic solvent. My invention pertains especially to lacquers which comprise a solution in a benzenoid hydrocarbon of a high grade gum or resin of the kind hereinafter described in conjunction with from about 10 to 50% of China wood oil based on the weight of gum or resin used.

I employ the expression lacquers or gum lacquers to refer to solutions of gums or resins in volatile solvents especially adapted for application to metal, as distinguished from spirit varnishes which are solutions of gums or resins in volatile solvents intended for application to wood.

Up to the present time the most successful lacquers, from a commercial standpoint, have been pyroxylin lacquers. Gum lacquers are valued according to their ability to shed water, speed of drying at normal temperature of the film deposited by them, and freedom from chalkiness on rubbing. Up to this date no gum lacquer can be found in the open market that will fulfill all these requirements and whose price is sufficiently low to compete successfully with pyroxylin lacquers. The highest quality gum lacquers known contain mostly highly refined shellac as the base and a large percentage of fusel oil in the solvent mixture making the coat of such a combination prohibitive for most purposes, particularly at the present time.

The main advantages of the ordinary gum lacquers when compared with pyroxylin or pyroxylin gum lacquers are (1st) low cost, (2) ability to shed water, therefore allowing lacquering of metals not previously dried, and (3rd) ease of application. This last point is particularly appreciated in such work as lacquering of chandelier chains, links and small objects. Here pyroxylin lacquers can hardly be used as they would web on account of their high viscosity or if thinned down considerably the resulting film would be too thin to offer protection against tarnishing. Gum lacquers, being high in solids and at the same time of low viscosity work very well for dipping and brushing purposes and give a bright finish which adheres firmly to the metal and offers relatively good protection from tarnishing.

Although gum lacquers as above described offer certain advantages, their defects, such as slowness of drying and liability to chalk on rubbing, have been such as to seriously interfere with their general use.

The principal object of my invention is to provide a gum lacquer which dries quickly, which does not chalk on rubbing, and which possesses the other desired qualities of high grade lacquers.

I have discovered, in the course of a careful research on this subject, that a lacquer having to a satisfactory degree the desired properties above mentioned can be prepared from a large number of natural gums or resins by combining therewith, in the proportions of not more than 50% of the weight of resin present, a vegetable drying oil having the following properties:—

Specific gravity, .935 to .944 at 15° C.; saponification value, 189.8 to 196.6 (i. e. from about 189 to 197); iodine value, 158 to 173.3; refraction index, 1.5110 to 1.5239 at 20° C.

The principal oil whose properties fall within the above limits, and the oil which I consider preferable, is China wood oil, either crude or refined.

As much as one-half of the China wood oil may ordinarily be replaced by another vegetable drying oil such as raw or boiled linseed oil or soya-bean oil.

The function of the China wood oil in the new composition is to soften and toughen the resin film which forms the coating of the lacquered metal. Without a softener of some kind the resin film is brittle and easily disintegrated, with a consequent appearance of chalkiness. Most of the waxes, oils, and other organic compounds which were tried out as softeners, while improving the film with regard to chalking, at the same time hindered the proper drying of the films. China wood oil, however, actually accelerated the drying of the lacquer films, and at the same time greatly improved the films with respect to chalking. The favorable effect of the China wood oil is most noticeable when it is used in proportions of from about 10% to 50% of the total resin present. In practice I prefer to use from 20 to 25% of the oil based on the total resin content. Crude, boiled, and refined China wood oil will give uniformly good results.

The benzenoid hydrocarbons which are suitable as solvents and easily obtainable are chiefly benzene, toluene, xylene, and solvent naphtha. It is usualy preferable to employ mixtures of these hydrocarbons, since such mixtures as, for instance, 60% by volume of xylene and 40% by volume of benzene, may be obtained at a lower cost than that demanded for pure benzene, toluene, etc. However, any of the above hydrocarbons may be used alone, if desired.

In some cases it has been found advantageous to substitute for part of the benzenoid hydrocarbon a certain amount of lower boiling paraffin hydrocarbons, a mixture of such hydrocarbons suitable for this purpose being gasoline. It has also been found desirable, as will be hereinafter more fully described, to incorporate in the solvent a volatile water-insoluble alcohol.

The resin content of my new lacquers may consist of one or more gums or resins included in the following classes:—

1. Soluble resins with an acid value higher than 40, for example manila, sandarac, mastic, shellac, soluble copals, etc.

2. Soluble resins known as ester gums resulting from the esterification of colophony with alcohols such as glycerol, or with phenols, as for example phenol and naphthol.

3. Fused fossil resins as for example fused manila, kauri, Congo, Borneo, pontianak, etc.

With reference to class "1", soluble gums or resins with an acid value of less than 40, such as East India gum and gum dammar (acid value .25), do not yield satisfactory lacquers; and the same is true for colophony.

Regarding class "2", the main objection to the use of ester gums in lacquers which has prevented their more extensive use is due to the fact that they are slow drying. This defect is overcome to some extent, but not entirely, by the addition of China wood oil in accordance with my invention; if heat (50 to 80° C.) is used to dry such a lacquer, containing China wood oil, very good films are obtained.

The Borneo pontianak mentioned under class "3" above belongs to the copal type of gums and ought not to be confused with the rubber resin obtained from the low-grade rubber known variously as jelutong, pontianak, Gambria, etc.

The fused resins of class "3" are preferably obtained by heating the natural resin to a temperature between 300 and 350° C. until the reduction in weight of the resin due to the escape of volatile products amounts to about 25 or 30%, and the resin has become soluble in benzine.

In preparing the new lacquers from the above described gums and resins and China wood oil, these ingredients may as a rule be dissolved in the benzenoid hydrocarbon or other solvent at ordinary room temperature, although in some cases it may be desirable to heat the mixture to accelerate solution. The ingredients may be mixed in any desired order, although it is preferable to add the solvents to the dissolving vessel before adding the gum to prevent the latter from sticking to the sides of the vessel. After solution has been accomplished the liquid is filtered to remove sand, or other insoluble substances that may be present; the solution is then ready for use.

When the lacquer is to be used for wet work, that is where the metal is to be lacquered is still wet from a cleaning operation when the lacquer is applied, I have found it to be desirable to replace part of the benzenoid hydrocarbons with water-insoluble alcohols of suitable boiling range, as, for example, normal and iso-butyl alcohol and fusel oil, the latter consisting mainly of amyl alcohol. In general such alcohols are suitable as are not miscible with water, and which volatilize at such a rate as not to substantially retard drying of the lacquer coating. Such alcohols as butyl alcohol and those contained in fusel oil may be referred to generically as monohydric alcohols containing from four to six carbon atoms.

Because of the favorable action of China wood oil in accelerating the drying of the lacquer film it was found possible to use another vegetable drying oil in conjunction with the China wood oil without retarding the drying of the film beyond the prescribed limits. In preparing a lacquer from vegetable oils such as linseed oil, in addition to China wood oil, I use them in such proportions that the total oil content will be from 10 to 50%, and preferably 20%, of the total resin content of the lacquer.

Typical examples or formulas of lacquers illustrating my invention in connection with the three above-described classes of gums, are as follows:—

For Class 1, soluble gums:

*Example I (percentages being by weight).*

| | Per cent. |
|---|---|
| Sandarac | 15 |
| China wood oil | 4 |
| Xylene | 11 |
| Benzene | 16 |
| Gasoline | 22 |
| Butyl alcohol | 32 |

Example II.

| | Per cent. |
|---|---|
| Virgin shellac | 3.1 |
| Manila copal | 6 |
| Sandarac | 6 |
| China wood oil | 2 |
| Linseed oil (raw or boiled) | 2 |
| Toluene | 23.8 |
| Gasoline | 25.7 |
| Butyl alcohol | 31.4 |

Example III.

| | Per cent. |
|---|---|
| Spirit copal chips (renovated) | 15 |
| China wood oil | 2 |
| Soya-bean oil | 2 |
| Refined fusel oil | 15 |
| Benzene | 26 |
| Xylene | 40 |

For Class 2, ester gums:

Example IV.

| | Per cent. |
|---|---|
| Ester gum (Synthe copal W W extra pale) | 15 |
| China wood oil | 6 |
| Benzene | 30 |
| Toluene | 49 |

Example V

| | Per cent. |
|---|---|
| Ester gum (Synthe copal W W extra pale) | 7.5 |
| Fused kauri gum | 7.5 |
| China wood oil | 3 |
| Boiled linseed oil | 2 |
| Refined fusel oil or butyl alcohol | 10 |
| Benzene | 20 |
| Toluene | 25 |
| Xylene | 25 |

For Class 3, Fused fossil resins:

Example VI.

| | Per cent. |
|---|---|
| Fused kauri | 15 |
| China wood oil | 5 |
| Benzene | 32 |
| Xylene | 48 |

Example VII.

| | Per cent. |
|---|---|
| Fused manila | 15 |
| China wood oil | 2 |
| Boiled linseed oil | 2 |
| Toluene | 81 |

Example VIII.

| | Per cent. |
|---|---|
| Fused congo | 15 |
| China wood oil | 6 |
| Toluene | 49 |
| Benzene | 20 |
| Butyl alcohol | 10 |

Example IX.

| | Per cent. |
|---|---|
| Fused Borneo pontianak | 15 |
| China wood oil | 4 |
| Soya-bean oil | 4 |
| Benzenoid hydrocarbons | 77 |

Example X.

| | Per cent. |
|---|---|
| Fused manila | 15 |
| China wood oil | 2 |
| Boiled linseed oil | 2 |
| Toluene | 60 |
| Gasoline | 21 |

Synthe copal W W extra pale mentioned in Examples 4 and 5 is the trade name of an ester gum obtained by condensing glycerine with rosin (colophony) and consists essentially of the glyceryl ester of abietic acid.

Although I have described my invention in great detail, it will be understood that the above examples are merely illustrative and that various changes may be made in the proportions of the various ingredients and in the ingredients themselves without departing from my invention.

I claim:

1. A lacquer comprising 100 parts of a high grade natural resin soluble in a mixture of benzenoid hydrocarbons, from about 10 to 50 parts of a softener comprising China wood oil, and a solvent comprising a benzenoid hydrocarbon and a volatile alcohol substantially immiscible with water.

2. A lacquer comprising 100 parts of a soluble resin having an acid value higher than 40, from about 10 to 50 parts of a softener comprising China wood oil and a volatile organic solvent containing a volatile alcohol substantially immiscible with water.

3. A lacquer comprising 100 parts of a soluble resin having an acid value higher than 40, from about 10 to 50 parts of a softener comprising China wood oil and a volatile organic solvent containing a monohydric alcohol having from 4 to 6 carbon atoms, and being substantially immiscible with water.

4. A lacquer comprising 100 parts of a soluble resin having an acid value higher than 40, from about 10 to 50 parts of a softener comprising China wood oil and a solvent comprising a benzenoid hydrocarbon and a monohydric alcohol having from 4 to 6 carbon atoms and being substantially immiscible with water.

5. A coating composition comprising 100 parts of a fused fossil resin and from about 10 to 50 parts of a vegetable drying oil having a specific gravity between .936 to .944 at 15° C., a saponification value between 189 and 197, an iodine value between 158 and 173.3, and a refraction index between 1.5110 and 1.5239 at 20° C.

6. A coating composition comprising 100 parts of a fused fossil resin and from about 10 to 50 parts of a softener comprising China wood oil.

7. A coating composition comprising 100 parts of a fused fossil resin and from about 10 to 50 parts of a softener comprising China wood oil and another vegetable drying oil.

8. A coating composition comprising 100 parts of a fused fossil resin and from about 20 to 25 parts of a softener comprising China wood oil and linseed oil.

9. A coating composition comprising a fused fossil resin, a vegetable drying oil having a specific gravity between .936 to .944 at 15° C., a saponification value between 189 and 197, an iodine value between 158 and 173.3, and a refraction index between 1.5110 and 1.5239 at 20° C., and a solvent comprising a benzenoid hydrocarbon and a volatile alcohol substantially immiscible with water.

10. A coating composition comprising a fused fossil resin, a vegetable drying oil having a specific gravity between .936 to .944 at 15° C., a saponification value between 189 and 197, an iodine value between 158 and 173.3, and a refraction index between 1.5110 and 1.5239 at 20° C., and a solvent comprising a benzenoid hydrocarbon, a low boiling paraffin hydrocarbon and a monohydric alcohol containing from 4 to 6 carbon atoms and being substantially immiscible with water.

11. A coating composition comprising 100 parts of a fused fossil resin, from about 10 to 50 parts of a softener comprising China wood oil, and a solvent comprising a benzenoid hydrocarbon.

12. A coating composition comprising 100 parts of a fused fossil resin, from about 10 to 50 parts of a softener comprising China wood oil and another vegetable drying oil, and a solvent comprising a benzenoid hydrocarbon.

13. A coating composition comprising 100 parts of a fused fossil resin, from about 20 to 25 parts of a softener comprising China wood oil and linseed oil, and a solvent comprising a benzenoid hydrocarbon.

14. A coating composition comprising 100 parts of a fused fossil resin, from about 10 to 50 parts of a softener comprising China wood oil, and a solvent comprising a benzenoid hydrocarbon and a volatile alcohol substantially immiscible with water.

15. A coating composition comprising 100 parts of a fused fossil resin, from about 10 to 50 parts of a softener comprising China wood oil and another vegetable drying oil, and a solvent comprising a benzenoid hydrocarbon and a volatile alcohol substantially immiscible with water.

16. A coating composition comprising 100 parts of a fused fossil resin, from about 20 to 25 parts of a softener comprising China wood oil and linseed oil, and a solvent comprising a benzenoid hydrocarbon and a volatile alcohol substantially immiscible with water.

17. A coating composition comprising 100 parts of a fused fossil resin, from about 10 to 50 parts of a softener comprising China wood oil, and a solvent comprising a benzenoid hydrocarbon, a low boiling paraffin hydrocarbon and a monohydric alcohol containing from 4 to 6 carbon atoms and being substantially immiscible with water.

18. A coating composition comprising 100 parts of a fused fossil resin, from about 10 to 50 parts of a softener comprising China wood oil and another vegetable drying oil, and a solvent comprising a benzenoid hydrocarbon, a low boiling paraffin hydrocarbon and a monohydric alcohol containing from 4 to 6 carbon atoms and being substantially immiscible with water.

19. A coating composition comprising 100 parts of a fused fossil resin, from about 20 to 25 parts of a softener comprising China wood oil and linseed oil, and a solvent comprising a benzenoid hydrocarbon, a low boiling paraffin hydrocarbon and a monohydric alcohol containing from 4 to 6 carbon atoms and being substantially immiscible with water.

20. A lacquer comprising 100 parts of a soluble resin having an acid value higher than 40, from about 20 to 25 parts of a softener comprising China wood oil and a volatile organic solvent containing a volatile alcohol substantially immiscible with water.

21. A coating composition comprising 100 parts of a fused fossil resin and from about 20 to 25 parts of a softener comprising China wood oil.

In testimony whereof I affix my signature.

JOHANNES M. KESSLER.